June 11, 1963 — P. MAUBORGNE — 3,093,340
FIXED-DRUM TYPE FISHING REEL
Filed June 12, 1959 — 2 Sheets-Sheet 1

Inventor
P. Mauborgne

3,093,340
Patented June 11, 1963

1

3,093,340
FIXED-DRUM TYPE FISHING REEL
Paul Mauborgne, Bernouville, Eure, France
Filed June 12, 1959, Ser. No. 820,030
Claims priority, application France June 26, 1958
8 Claims. (Cl. 242—84.21)

This invention relates to fixed-drum type reels, i.e. reels in which the axis of the spool is parallel to the fishing rod, so that on being cast the line can unwind without movement of any part of the reel.

The invention relates more particularly to reels in which the line hanger holders are rotated and the spool is not rotated.

In his Patent No. 2,600,558, the applicant has already disclosed a reel in which the line hanger is moved away from the spool by movement in an axial direction in order to facilitate unwinding of the fishing line from the spool, this movement being entirely distinct from the alternating axial movement of one of these two parts relative to the other to obtain distribution of the line neatly on the spool during the winding-in operation.

This was achieved with the three movements being controlled by the operating crank handle, the casting operation being permitted by turning the handle in an opposite direction to that which simultaneously brings about winding-in rotation of the line hanger and the alternating movement of the spool to effect distribution of the line on the spool.

The device of the patent, however, has the drawback that it requires the handle to be stopped in some fixed position when winding-in is completed, or that it must be returned to that position prior to casting the line.

An object of the present invention is to provide a control means for the casting that is independent of the position of the crank handle.

A further object of the invention is to allow push-button control, using one finger of the hand holding the rod, thus providing quicker and easier operation.

Another object of the invention is to provide for retraction of the line hanger, i.e. of the pick-up finger which contacts the line and guides it as it is wound in.

A still further object of the invention is to allow simpler and cheaper production of the device for distributing the line on the spool.

Although the three relative movements taking place between the two parts can give rise to numerous combinations, it is proposed to describe, by way of example, only two embodiments of the device, it being easy to deduce other embodiments therefrom. However, it is to be clearly understood that the applicant in no way intends the scope of his invention to be limited to, or by, the specific examples chosen for illustrative purposes.

Figure 1:
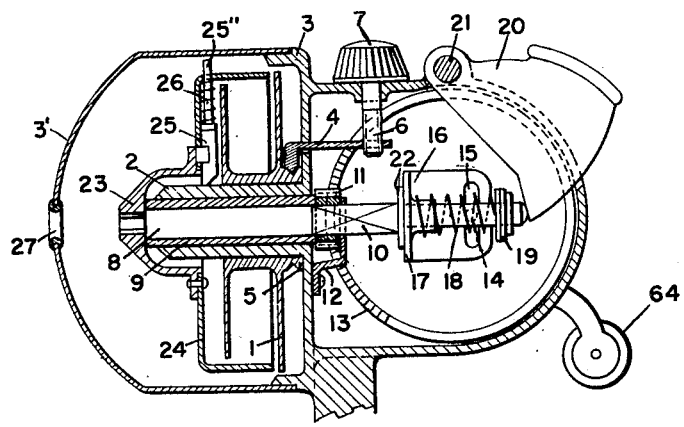
Figure 2:
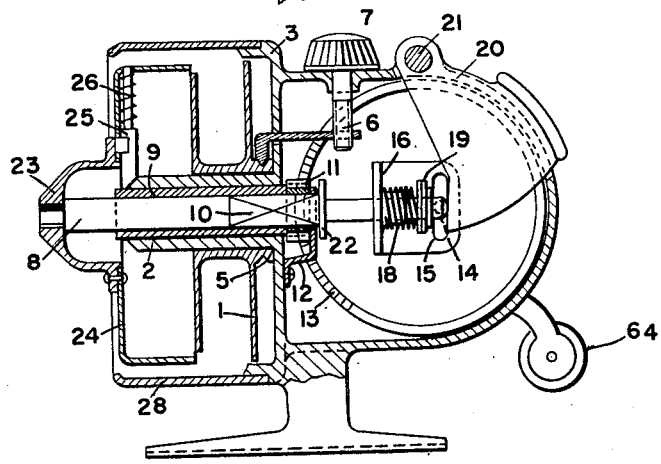

In the accompanying drawings, FIGS. 1 and 2 are schematic axial cross-sections of a device in which the ipck-up holder or line hanger provides both the rotating and the alternating movements, FIG. 1 corresponding to the winding-in position and FIG. 2 to the unwinding or casting position.

These two figures differ slightly by virtue of the shape of the cover, but this in no way affects the actuating mechanism.

Figure 3:
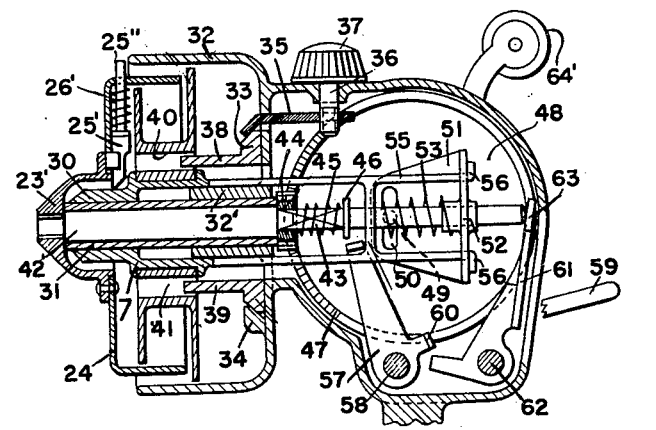
Figure 4:
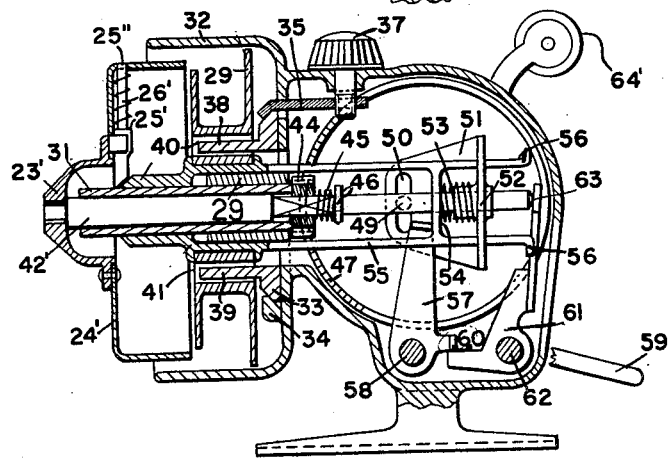

FIGS. 3 and 4 are schematic axial sectional views of a device in which axial movement of the spool provides the alternating movement for distribution of the line on the spool and the pick-up holder or line hanger carrier provides the rotational movement.

Referring now to FIGS. 1 and 2, numeral 1 designates the spool mounted on the sleeve 2 integral with the casing 3, on which sleeve the spool is restrained from rotating by the resilient blade 4, the lip of which engages in the

2 groove 5, tension of the blade 4 being adjusted by the screw 6 which is actuated by the knob 7.

The spindle 8 slides and rotates inside the bush 9 of the sleeve 2. This spindle is provided with a square portion 10 which slides through the hollow pinion 11 which is itself restrained from translation by the lug 12 fixed to the casing.

The pinion 11 is driven in rotation by the toothed wheel 13 which is operated by the usual crank handle 64. The wheel carrying the toothed rim is provided with a pin 14 which engages in a slot 15 in strap 16. The rear end of the spindle 8 extends through a flange or base 17 of strap 16 and is slidable and rotatable with respect thereto. Bearing against the base 17 of the strap 16 is a spring 18, the other end of which bears against a collar 19 integral with the spindle 8.

A thumb-piece 20 is pivoted at 21 on the casing and is normally maintained in the position shown in FIG. 1 by a conventional light spring (not shown). This thumb-piece 20 is arranged to contact and to act upon the rear end of spindle 8 when pushed down and enables the spindle 8 to be pushed from the right towards the left, as seen in FIG. 2, against the action of the spring 18, the strap 16 being held motionless by the pin 14 as long as the toothed wheel 13 does not move.

The collar or stop 22, integral with the spindle 8, acts as an end stop for the spindle 8 by abutting against the base 17 of the strap (FIG. 1).

The spindle 8 carries a hub 23 which acts as a mount for the bell-shaped rotary flier 24. Inside this flier is the pick-up pin or hanger 25 that at its outer end 25″ forms a pick-up finger which in extended reeling-in position protrudes, as seen in FIGURE 1, through the bell but which is pulled back inwardly into the retracted position seen in FIG. 2 by the spring 26 which bears against the bell 24 at one end and against a shoulder portion of part 25 within the bell. The radially innermost end of this part 25 is provided with a bevel cam surface, the angle of which may be the same as that of the conical end of the sleeve 2.

FIG. 1 shows an enclosing shell cover 3′ with an axial aperture 27 for the fishing line.

In FIG. 2, the protective shroud 28 is cylindrical. This is the "open-faced" form of presentation.

The unit operates as follows:

With the spool in the position shown in FIG. 1, rotation of the crank handle 64 causes the spindle 8 to rotate under the influence of the wheel 13 and the pinion 11. At the same time, the pin 14 imparts a to-and-fro axial movement to the strap 16, this movement being transmitted leftward by action of the strap base 17 against the collar 22, and to the right by action of the strap base 17 on the collar 19 via the spring 18. The pick-up holder, together with the pick-up 25, are in rotation, the pick-up 25 being in the protruding position since its inner end bears against the outer cylindrical surface of the extended sleeve 2, the spring 26 being compressed. The pick-up is thus able to contact the line and cause it to be wound in, while the to-and-fro axial movement ensures uniform distribution of the line over the spool. In order to switch to the casting position shown in FIG. 2, the thumb-piece 20 is depressed, which in turn pushes the spindle 8 from right to left.

Leftward movement of the spindle 8 carrying the flier and the pick-up holder will allow the bevelled extremity of the pick-up holder or pin 25 to be thrust downward until, under the action of the spring 26, it comes to bear against the sleeve 9, the length of sleeve 2 being calculated accordingly. Subject, however, to the angle of the two contact surfaces being carefully chosen, the bevelled end of the line-catcher or pick-up 25 will cooperate frictionally with the sleeve when it has been moved to the FIG. 2 position, and no further attention need be paid to the thumbpiece 20. In this position the pick-up remains retracted and casting can take place freely.

In order to return to the position shown in FIG. 1 all that is required is to operate the handle 64. By substituting sliding friction for the static friction, and also by tending to increase the tension in the spring 18, initial rotation of the handle enables the bevelled end of the pick-up to be dislodged and thrust into its normal winding-in position, while return action of the spring 18 returns the spindle 8 to the right.

In FIGS. 3 and 4, numeral 29 designates the spool mounted on a non-rotatable support 30 which can slide on a sleeve or bushing 31 which is fixed to the casing 32. The non-rotatable support 30 bears on sleeve 31 through the medium of the front portion which is integral with said support. Bushing 31 is mounted in a fixed sleeve 32' which may be an integral part of the casing.

The spool is able to rotate in relation to the support 30 but is normally braked by the hub of the braking collar 33 which rotates in a groove under a projection 34 of the casing, this collar being braked by a resilient blade 35 which acts as a brake-shoe and whose tension may be adjusted by means of a screw 36 which is actuated by the knob 37. The braking collar is linked in rotation with the spool 29 via arms 38 and 39 which slide in apertures 40 and 41 in the spool hub for this purpose.

The spindle 42' slides and rotates in the sleeve 31 and is provided with a square portion 43 which is able to slide in the pinion 44 which is thrust towards the left in FIGS. 3 and 4, against the end of the sleeve 31 by a spring 45 which bears against a collar 46 integral with the spindle 42'.

The pinion 44 is driven in rotation by the toothed rim 47 of toothed wheel 48. A conventional crank handle 64' may be used to rotate wheel 48. The wheel 48 carries a pin 49 which engages in a slot 50 of the strap 51 in which the rear end of the spindle 42' may slide and rotate.

In this strap and bearing against the bearing portion 52 is a spring 53, the other end of which bears against a cross-piece 54 of the arms 55 which are an integral part of the spool support 30. End stops 56 determine the maximum distance between the spool and the strap.

The lever 57 acting upon the cross-piece 54 and pivoted on the casing at 58 is actuated by a lever 59 secured to pivot 58 outside of the casing. Near its pivot or fulcrum the lever 57 carries a short finger 60 which cooperates with the bell-crank lever 61 pivoted on the casing at 62. The end 63 of lever 61 bears against the end of the spindle 42'.

To the other end of spindle 42' is fixed a hub 23' which carries the bell-shaped flier 24'. Inside the latter is the pick-up 25' which is able to protrude radially through the bell-shaped flier 24' but which tends to be pulled inwards by the spring 26' bearing against the flange of the flier and a shoulder portion of the part 25'. The inner end of this part 25' is bevelled for cooperation with the conical end of the support 30 in the same way as in the preceding example where part 25 cooperates with sleeve 2.

The operation is as follows:
With the spool in the position shown in FIG. 3, rotation of the crank handle rotates the spindle 42' via the toothed rim 47 of wheel 48 and the pinion 44, while the pin 49 imparts a to-and-fro movement to the strap 51 which is in turn transmitted to the spool support 30 from left to right through the stops 56 and the arms 55, and from right to left through the spring 53, the cross-piece 54 and the arms 55.

The flier 24' rotates, and with it the protruding pick-up 25'. The latter engages the line and winds it on to the spool, the to-and-fro movement of the spool ensuring correct distribution of the line during the winding-in operation.

In order to switch to the position illustrated in FIG. 4 for casting, appropriate displacement is imparted to the lever 59 integral with the lever 57 which, by acting upon the cross-piece 54, causes the spool to move to the extreme right-hand position by compressing the spring 53, while at the same time the finger 60 tips the lever 61 which in turn thrusts the spindle 42' to the left and with it the flier moves towards the left by compressing the spring 45. Thus here the movement which positions the spool and the flier for casting is shared by both components.

At the end of this movement, the pick-up withdraws owing to the fact that, under the action of spring 26' when the bevelled end of element 25' engages with the conical extremity of the non-rotatable support 30 the lever 59 may be freed as in the preceding example. Return to the position shown in FIG. 3 is obtained by rotation of the handle 64'. This causes the bevelled part of the pick-up pin or holder 25' to rotate relatively to the conical part of support 30, and since the friction in motion is less than the static friction the return movement to the left of the spool under the action of spring 53 and of the flier under the action of spring 45 is accomplished.

As in the preceding example, if, at the moment of depressing lever 59, the pin 49 is not in the extreme left-hand position, a rotation of no consequence may take place in one direction, and rotation in the other direction may be prevented by a non-return pawl (not shown).

What I claim is:
1. In a fishing reel of the type adapted to be selectively conditioned for reeling in or for casting, said reel having a spool support, a non-rotating spool mounted on said spool support, a rotating flier mounted on a rotatable shaft forming a flier support coaxially and forwardly of said spool, and having a pick-up pin mounted for radial movement in said flier to extend outwardly of said flier when said reel is conditioned for reeling in, and being retracted within the flier when said reel is conditioned for casting, said pick-up pin being biased radially inwardly, crosshead and crank means to cause relative reciprocation of said rotatable shaft carrying said flier and said spool support axially of each other as the fishing line is reeled in, the novelty including a cylindrical portion of said spool support extending from said spool toward said flier coaxially of said spool and of said flier surrounding said rotatable shaft, said cylindrical portion terminating adjacent said flier in a conical cam surface, said pick-up pin being provided at its radially inward end with a contact portion bearing against said cylindrical portion when said reel is conditioned for reeling in and provided on its face toward said spool with a cam surface complementary to said conical cam surface on said cylindrical portion, and manually operable means to condition said reel to casting condition, said manually operable means operating to separate said spool and said flier support axially independently of said crank and crosshead means so that said flier, carrying said pick-up pin, is moved to a position in which the radially inward end of said pick-up pin is moved axially beyond said cylindrical portion, spring means operating in opposition to said manually operable means to bias said spool and flier relative to each other toward reeling in condition, said complementary cam surfaces being adapted, upon relative movement between said spool support and flier, to cam said pick-up pin radially outwardly into pick-up position to condition the reel for reeling in.

2. A fishing reel of the type adapted to be selectively conditioned for reeling in or for casting, said reel having a rotatable flier mounted on a rotatable shaft forming a first support to support said flier, a sleeve surrounding said rotatable shaft forming a second support for supporting a spool coaxially of said first support, a spool mounted on said second support, means including a gear to rotate said first support, an eccentric pin forming a crank mounted on said gear, a crosshead engaging said eccentric pin, means on one of said supports engaging said crosshead to cause relative reciprocation between said first and said second supports upon rotation of said flier by said gear when said reel is conditioned for reeling in, whereby said spool and flier are reciprocated with respect to each other, said means on one of said supports engaging said crosshead comprising a stop on said one of said supports normally engaging said crosshead for positive movement of said one of said supports in one axial direction, spring means between said one of said supports and said crosshead to provide movement of said one of said supports in the other axial direction, manually operable means adapted to engage said one of said supports independently of said gear and of said crosshead to positively move said one of said supports against said spring means to disengage said stop from said crosshead to condition the reel for casting.

3. The fishing reel of claim 2, in which said flier is provided with a pick-up pin which extends radially of said flier and is biased radially inwardly, and said sleeve extends from said reel axially toward said flier, the radial inward end of said pick-up pin contacting the surface of said sleeve when said reel is conditioned for reeling in, and the length of said sleeve is such that upon conditioning the reel for casting the pick-up pin is moved to a position beyond said sleeve, whereupon said pick-up pin is moved inwardly, said pick-up pin and said sleeve being shaped so that said pick-up pin will be cammed radially outwardly upon movement of said one of said supports under the influence of said spring means to return said reel to reeling in condition.

4. A fishing reel of the type adapted to be selectively conditioned for reeling in or for casting, said reel having a rotatable flier mounted on a rotatable shaft forming a first support to support said flier, a sleeve surrounding said rotatable shaft forming a second support for supporting a spool coaxially of said first support, a spool mounted on said second support, means including a gear lying in a plane parallel to said rotatable shaft to rotate said first support, an eccentric pin forming a crank mounted on said gear, a crosshead engaging said eccentric pin, means on said second support engaging said crosshead to cause relative reciprocation between said first and said second supports upon rotation of said flier by said gear when said reel is conditioned for reeling in, whereby said spool and flier are reciprocated with respect to each other, and manually operable means adapted to engage said second support independent of said gear and of said crosshead to positively move said second support to disengage said means on said second support from said crosshead to condition the reel for casting, and means biasing said second support toward its position engaging said crosshead to condition said reel to reeling in condition.

5. In a fishing reel of the type having a spool adapted to hold a fishing line and a flier coaxial therewith by which the fishing line may be wound on said spool, means mounting said flier and spool for relative axial movement with respect to each other, means to rotate said flier, a mechanism of the type converting rotary to reciprocating motion operatively connected to said means to rotate the flier to cause relative reciprocation between said flier and said spool during the rotation of the flier, a second mechanism to increase the axial distance between said flier and said spool to a maximum, said second mechanism including two portions slidable with respect to each other, one of said two portions including stop means to limit relative sliding in one direction to define a normal relative position of said two portions, spring means resiliently holding said two slidable portions in said normal relative position, and a finger piece operative to move said two portions relative to each other against the bias of said spring means to increase the axial distance between said flier and said spool to a maximum, a radially movable pick-up pin on said flier biased radially inwardly, part of said means mounting said flier and said spool for relative axial movement being positioned to engage the radially inward end of said pick-up pin when said means to reciprocate said spool and flier relative to each other is operative and retracted from engagement with said radially inward end of said pick-up pin when said axial distance between said flier and said spool is a maximum upon relative movement of said two portions by manipulation of said finger piece.

6. The fishing reel of claim 1, in which said crosshead and crank means is operatively mounted with respect to said rotatable shaft whereby said rotatable shaft is reciprocated axially to cause relative reciprocation of said flier with respect to said spool.

7. The fishing reel of claim 1, in which said crosshead and crank means is operatively mounted with respect to said spool support whereby said spool support is reciprocated in a direction axially of said spool whereby said spool is reciprocated with respect to said flier.

8. The fishing reel of claim 1, in which the angle of said complementary cam surfaces is such that the axial bias will not cam said pick-up pin outwardly unless said flier is rotated with respect to said spool.

References Cited in the file of this patent

UNITED STATES PATENTS

| | | |
|---|---|---|
| 2,613,468 | Hand | Oct. 14, 1952 |
| 2,711,292 | Taggart et al. | June 21, 1955 |
| 2,828,088 | Denison et al. | Mar. 25, 1958 |
| 2,903,202 | Sarah | Sept. 8, 1959 |
| 2,911,165 | Sarah | Nov. 3, 1959 |
| 3,000,586 | Mandolf | Sept. 19, 1961 |

FOREIGN PATENTS

| | | |
|---|---|---|
| 1,110,429 | France | Oct. 12, 1955 |